United States Patent [19]
Bridges et al.

[11] 4,262,199
[45] Apr. 14, 1981

[54] INFRA-RED TARGET DETECTION AND RECOGNITION SYSTEM

[75] Inventors: Clive A. Bridges, Ascot; David A. Beaumont, Camberley, both of England

[73] Assignee: The Marconi Company Limited, Essex, England

[21] Appl. No.: 40,929

[22] Filed: May 21, 1979

[30] Foreign Application Priority Data

May 26, 1978 [GB] United Kingdom ............ 23125/78

[51] Int. Cl.³ .................... G01J 1/00; H04N 5/33
[52] U.S. Cl. .................... 250/348; 250/342; 250/347; 358/113
[58] Field of Search ............ 250/347, 334, 236, 348, 250/342; 358/113, 206; 350/6.5, 6.6

[56] References Cited

U.S. PATENT DOCUMENTS

| | | | |
|---|---|---|---|
| 3,209,149 | 9/1965 | Tucker | 250/334 |
| 3,475,608 | 10/1969 | Pardes | 250/347 |
| 3,622,788 | 11/1971 | Briggs | 250/347 |
| 3,723,642 | 3/1973 | Laakmann | 250/332 |
| 3,924,130 | 12/1975 | Cohen et al. | 250/347 |
| 4,072,863 | 2/1978 | Roundy | 250/334 |

OTHER PUBLICATIONS

Saufley et al., "An Autoranging Scanning System and Compatible Methods of Noise Reduction", Rev. Sci. Instrum., vol. 45, No. 7, Jul. 1974, pp. 882-887.

*Primary Examiner*—Alfred E. Smith
*Assistant Examiner*—Carolyn E. Fields
*Attorney, Agent, or Firm*—Kirschstein, Kirschstein, Ottinger & Cobrin

[57] ABSTRACT

An I. R. target detection arrangement having a high-inertia line scan and a low inertia frame scan. The line scan is performed by scanning a line of I. R. detectors broadside over a section of the target scene, storing the detector outputs for each point on each line, repeating the line scan and output storage a number of times without change of frame scan, accumulating the outputs for each point obtained in repeated scans, and stepping the frame scan to the next section. A greater signal/noise ratio is thus obtained. Upon detecting a target, the frame scan is switched to a continuous mode and the field of view is narrowed and magnification increased.

In each section interlacing may be obtained by stepping the frame scan half the line pitch and repeating the line scan process before proceeding to the next section.

4 Claims, 7 Drawing Figures

INFRA-RED TARGET DETECTION AND RECOGNITION SYSTEM

This invention relates to infra-red target detection arrangements. By "target" is meant any object or person which is a source of infra-red radiation and which is of interest. The invention is not limited to arrangements in which the object or person of interest is to be the target of a missile although such may well be the case in particular instances.

Arrangements are known in which an array of infra-red detector elements is, in effect, scanned over a field of view by a mirror arrangement. In one such arrangement a regular polygon having mirror facets is rotated on its axis continuously to provide a horizontal or line scan, while another mirror pivoted on an axis in its own plane 'nods' up and down over a small angle to provide a vertical or field scan. An array of infra-red detector elements, which may be a single line of closely spaced elements, is, in effect, projected on to a target area, each mirror facet of the rotating polygon covering a section of the area in the form of a horizontal band or swathe. The movement of the nodding mirror is controlled by a cam which causes a linear shift of the bands or swathes such that successive facets of the polygon produce bands which just cover the target area without overlap.

In the application of such arrangements to target detection it will commonly be important that a target is not missed because, perhaps, it is small, not very prominent among other, noise, signals, or because the signal strength is low as a result of a rapid scan rate. The latter may be a result of a requirement for the infra-red field scan to correspond precisely with the standard television raster scan so that the infra-red signals can be processed and fed directly to the video input of a conventional cathode ray tube display.

Accordingly, therefore, it is an object of the present invention to provide an infra-red target detection arrangement in which a target can be detected with greater certainty and a minimum of further equipment, than obtained hitherto.

According to the present invention therefore, an infra-red target detection arrangement includes an assembly of infra-red detection elements, means for scanning a field of view with said assembly to produce a signal representative of the infra-red level from point to point, said scanning means including first means for scanning in one coordinate direction and second means for scanning in a second coordinate direction, the scanning means being operative to scan the field in a plurality of sections in each of which the first means sweeps the section a predetermined number of times while the second means is substantially at rest, the second means being stepped from section to section, and the arrangement including storage means for storing a representation of the infra-red level throughout each sweep of said first means and for accumulating at least the highlights of each such representation over said predetermined number of times to provide a cummulative indication of any infra-red target that may be present.

The first and second scanning means may be operable to give a rectangular raster, line sweeps being produced by said first means and field sweeps by said second means.

The assembly of infra-red detection elements may be arranged to provide a band of parallel line sweeps by operation of the first means, each field section covering the same area as a band of line sweeps, and the storage means providing separate storage for each line of a band. Each section may be covered by interlaced bands of line sweeps, the second means being arranged to step half a line pitch between bands alternately with a step from one section to the next.

A target detection arrangement as aforesaid may be incorporated in a target detection and recognition system including means for assessing the accumulated content of said storage means against a reference signal level and providing an alarm response accordingly and means operative in dependence upon said alarm response to switch the second means to a continuous mode in which the whole field is scanned in each sweep of said second means.

In such a target detection and recognition system, there may be included optical means for presenting the target area to the scanning means, the optical means having an adjustable magnification factor and means for increasing it in dependence upon said alarm response.

An infra-red target detection arrangement in accordance with the invention, will now be described, by way of example, as incorporated in a detection and recognition system with reference to the accompanying drawings of which:

Figure 3A:
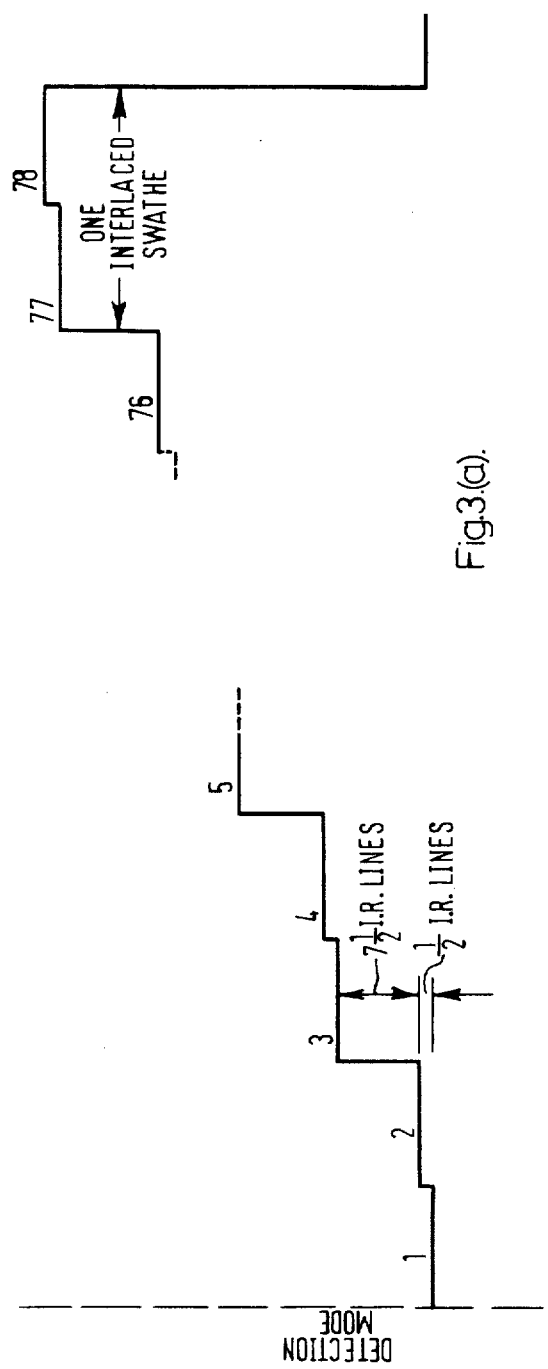
Figure 3B:
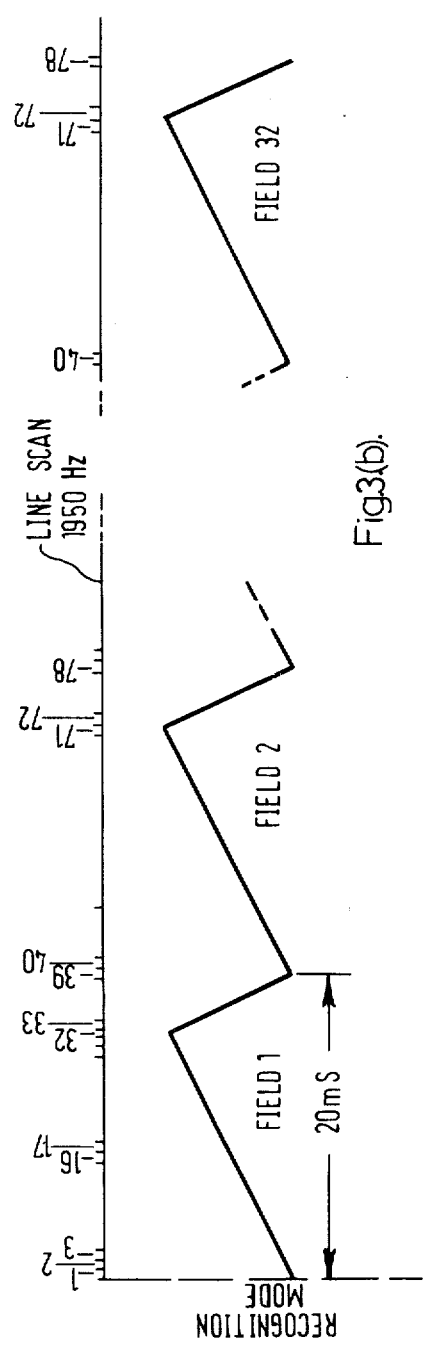
Figure 4:
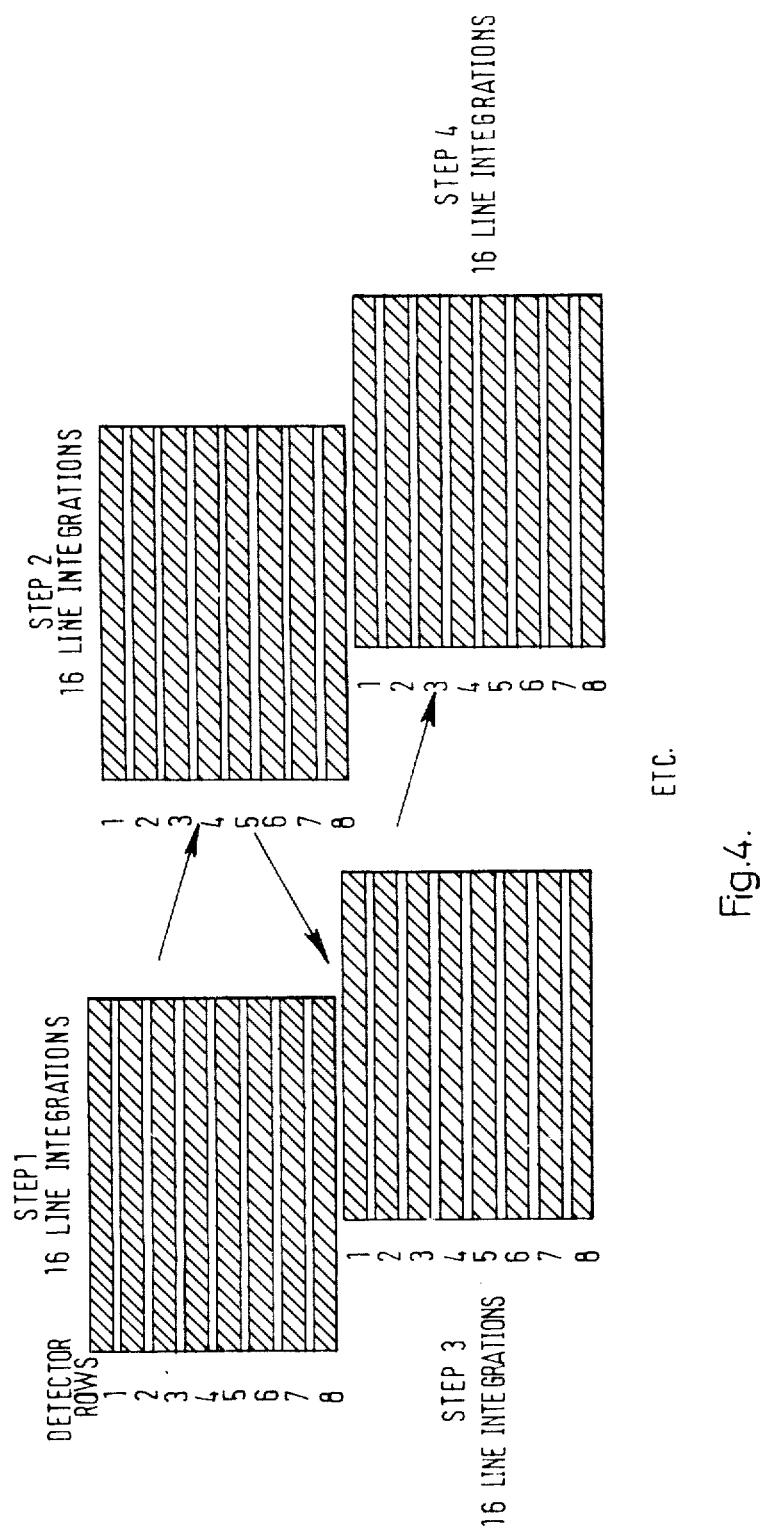
Figures 5, 6:
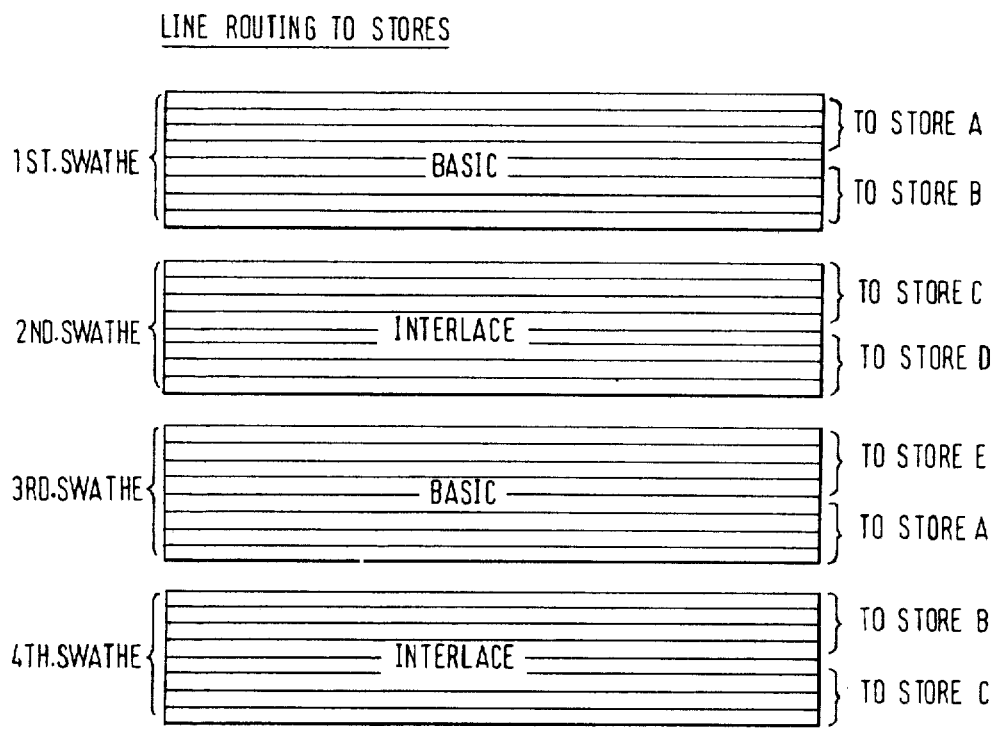

FIG. 3(a) and 3(b) are timing diagrams for the scanning arrangement in two modes of operation;

FIG. 4 is an operational diagram further illustrating the mode of operation of FIG. 3(a); and FIGS. 5 and 6 are diagrams illustrating signal storage sequences in the operating mode of FIG. 3(a).

The problem to be solved for successful infrared surveillance equipment is that of achieving reliable detection of a target at long range. Such detection calls for the design of a system with inherently good thermal (infra-red) and spatial resolution. These characteristics are offered by thermal scanners using discrete detector arrays with mechanical scanning mechanisms to provide the necessary line and field scan of the object scene.

In the surveillance, i.e. detection, mode, a high probability of target detection has to be coupled with a low false alarm rate. It can be shown that to achieve this requirement successfully it is necessary to integrate the target radiation over a time that is appreciably greater than that normally associated with a thermal imaging scanner compatible with conventional T.V.-type displays.

Figure 1:
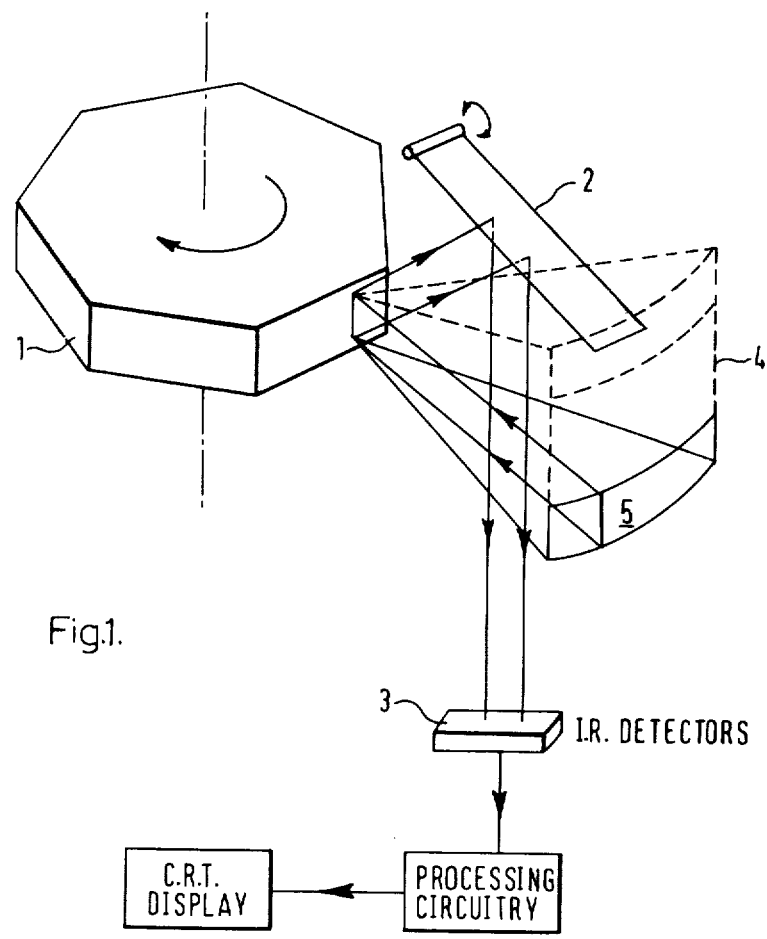
FIG. 1 is a diagrammatic perspective view of a basic known scanning arrangement.

Referring to FIG. 1, this shows a known infrared scanner in which a line scan is obtained by relatively high speed rotation of a high inertia faceted polygon 1, while a field scan is obtained by a nodding mirror 2 whose motion has a sawtooth waveform as shown in FIG. 3(b). The resulting rectangular scan corresponds on a line-for-line basis with a standard television raster.

The infra-red detectors 3 in FIG. 1 comprise basically eight detector elements in a linear array which, in effect, scan a band or swathe such as 5 of the scene 4 (in FIG. 1). The polygon 1 rotates at a facet rate of 1950 Hz which is thus the line scan rate. With eight lines in each band the effective line frequency is thus 15.6 kHz as for standard television.

The mirror 2 in a recognition mode has a nodding cycle of 20 mS. The mirror oscillation amplitude is of course such that successive swathes cover the field in a continuous and non-overlapping manner. Thirty-nine such swathes of eight lines each are required to complete a field of 312 lines, but only the first thirty two swathes are used, since the remaining seven take place during the return of the mirror 2 to its starting position, and are blanked off. The mirror 2 is driven so that successive field scans are displaced vertically by half of one infra-red line spacing. Successive field scans are thus interlaced to give a complete picture of 624 lines in 40 mS, i.e. at a frame rate of 25 Hz.

The very slight disparity between this 624 line picture and the standard TV 625 lines is resolved by an appropriate phase shift on the line output after each field scan, the error being obsorbed by the inherent substantial portion of each line scan which is beyond the field of view.

In the operational mode just described the whole field is covered rapidly and this mode is suitable when a target is known to be present and requires only to be recognised. This then is the recognition mode when the infra-red detector output after processing is displayed on a TV screen on a line for line basis. An optical telescope (not shown) which presents the field of view to the infra-red scanner, has an adjustable focal length to give a reduced field of view, and consequently greater magnification, in the recognition mode.

Before operating in the recognition mode however, it is necessary to establish the presence of a target. For this purpose no display is necessary, only an alarm signal, audio or visual, which must arise on detection of a target.

In this detection mode the nodding mirror 2 is arranged to operate in a stepwise manner as shown in FIG. 3(a) and FIG. 4, while the polygon 1 rotates normally. Each swathe of the field is repeated sixteen times without movement of the mirror 2. During each line sweep the outputs of the eight infra-red detectors 3 are converted by analogue/digital convertors (not shown) into serial digital signals representing the eight line-scan signals. These signals are stored and accumulated, each of the digitised line signals being added in as they arise. The result is thus an integrated version of the infra-red line signal which is assessed by processing circuitry including a peak detector to distinguish genuine targets from noise and other false target indications.

This integrating process occurs in each of the blocks in FIG. 4. After sixteen scans of a swathe of eight lines the mirror 2 is driven by a stepper motor to shift the swathe verically by half of one infra-red line spacing. This is effected very quickly since the mirror 2 is of relatively light construction and has no momentum prior to the shift. The polygon 1 continues rotating uniformly and further swathe of eight line scans is made, these being interlaced with the first eight. Storage accummulation and signal assessment then occur as before. In the third and fourth steps shown in FIG. 4 the frame mirror makes a shift of seven and one half lines and then a further step of half a line, the line scans being repeated sixteen times at each step.

Referring to FIG. 3(a), thirty-nine pairs of interlaced swathes are required to cover the whole field, the height of which is represented by the height of the step diagram. The time to cover the field is of course sixteen times as long as in the recognition mode.

Referring now to FIGS. 5 and 6, these show the storage sequence in the detection mode. There are five blocks of storage each of which can accommodate four parallel lines of output from the infra-red detectors. The accummulated digital output from each detector is processed to determine a signal peak which could indicate a target. If the peak detector is triggered, the position along the line and the line identity are stored as the coordinates of a potential target. This indication of position is compared with a subsequent indication derived from the stored output of the interlace field. In the particular application in question only moving targets are of interest and therefore, if the two potential target indications are coincident they are discounted. Each potential target indication has therefore only to be stored until the next interlace field and since the interlace field follows each basic eight line swathe immediately, the storage time and hence the storage, is a minimum.

The swathes shown in FIG. 5 correspond to those in FIG. 4 and it can be seen therefore that no store may be cleared before its contents have been compared with its interlaced 'other half'. Now the first line of each basic eight-line swathe overlaps, and must be compared with, the last line of the preceding eight-line interlace swathe so that, referring to FIG. 5, store D must not be overwritten before store E has been entered and compared with it. Because the interlace swathes follow immediately after each basic swathe, the storage necessary to achieve this is kept to a minimum.

With the method of integration employed, the relative movement of a target during the integration period is small and does not affect the process. This would not be the case for a scheme whereby integration of successive lines were achieved by storing line data from TV compatible (50 OHz) fields. Whilst such an idea would result in identical integration times, the overall time delay between swathe integration would be large (−640 mSec). In this case target movement would be significant resulting in loss of signal or greatly increasing the processing complexity.

For this reason the proposed method is seen as a novel approach to combining the surveillance and imaging requirements within a single scanner. It provides enhancement of the signal to noise ratio whilst allowing flexibility to develop and implement the choice of detection algorithms.

Figure 2:
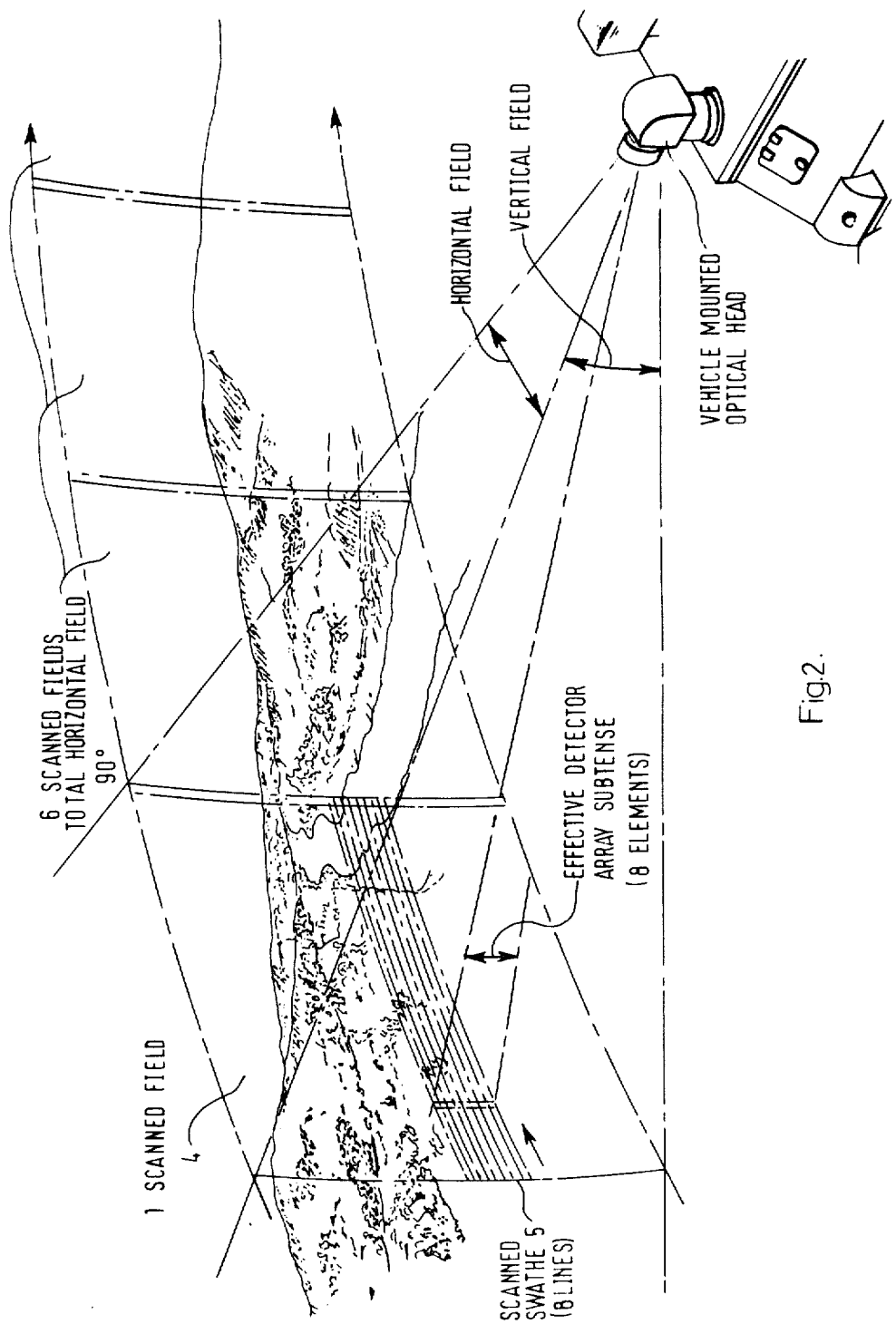
FIG. 2 is a perspective view of part of the detection arrangement mounted on a vehicle together with a typical field of view.

FIG. 2 indicates the general operation of the invention. The target detection arrangement may be mounted on a vehicle, the optical head being steerable to cover a number of horizontally adjacent fields of view 4 as shown. In the detection mode each field of view is scanned in basic and interlace swathes, 39 of which cover the complete field of view. On detection of a target an alarm is raised and the scanner automatically changes over to the recognition mode in which the mirror 2 'nods' at 50 Hz. At the same time the field of view is narrowed to increase the magnification for recognition purposes.

We claim:

1. An infra-red target detection and recognition system including an assembly of infra-red detection elements, means for scanning a field of view with said assembly to produce a signal representative of the infra-red level from point to point, said scanning means including first means for scanning in one coordinate direction and second means for scanning in a second coordinate direction, the scanning means being operative in a first mode to scan the field in a plurality of sections in each of which the first means sweeps the section a predetermined number of times while the second means is substantially at rest, the second means being stepped from section to section, and being operative in a second mode to scan the field of view repeatedly with said first means while said second means scans the field of view continuously, and the arrangement including storage means for storing a representation of the infra-red level throughout each sweep of said first means in said first operative mode for accumulating at least the highlights of each such representation over said predetermined number of times to provide a cumulative indication of any infra-red target that may be present, and means operable to give an alarm response and to switch the scanning means to said second mode if said cumulative indication exceeds a reference level.

2. A target detection arrangement according to Claim 1 wherein said assembly of infra-red detection elements is arranged to provide a band of parallel line sweeps by operation of said first means, each said field section covering the same area as a said band of line sweeps, and said storage means providing separate storage for each line of said band.

3. A target detection arrangement according to Claim 2 wherein in said first operative mode each said section is covered by interlaced bands of line sweeps, the second means being arranged to step half a line pitch between bands alternately with a step from one section to the next.

4. A target detection and recognition system in accordance with claim 1 including optical means for presenting the field of view to the scanning means, the optical means having an adjustable magnification factor and means for increasing said factor in dependence upon said alarm response.

* * * * *